(No Model.)

L. HARRIS.
WHEEL BOX AND AXLE.

No. 476,198. Patented May 31, 1892.

Witnesses
Clare A. Williams
Marian Longyear

Inventor
Levi Harris
By his Attorney
Lucius C. West

United States Patent Office.

LEVI HARRIS, OF KALAMAZOO, MICHIGAN, ASSIGNOR OF ONE-HALF TO OSCAR M. ALLEN, SR., OF SAME PLACE.

WHEEL BOX AND AXLE.

SPECIFICATION forming part of Letters Patent No. 476,198, dated May 31, 1892.

Application filed January 29, 1892. Serial No. 419,634. (No model.)

*To all whom it may concern:*

Be it known that I, LEVI HARRIS, a citizen of the United States, residing at Kalamazoo, county of Kalamazoo, State of Michigan, have invented a new and useful Vehicle-Wheel Box and Axle, of which the following is a specification.

My invention refers to that class of constructions in which the design has been to obviate end shucking and rattling of the wheel without the use of washers, either leather or otherwise.

The invention also refers to that class of vehicles in which the wheel is attached to the axle by a nut at the inner end of the wheel-box.

The leading object of my invention is to automatically prevent said end shucking or rattling without the use of washers and preserve the needed strength of the axle without enlarging the box and wheel-hub by a construction in which an internally-ribbed two-part nut is employed at the rear end of the hub of the wheel to attach said wheel to the axle, the ribs of said nut having bearings in a peripheral channel in said axle at the end of the wheel-hub, all as more particularly described and claimed below.

Figure 1:
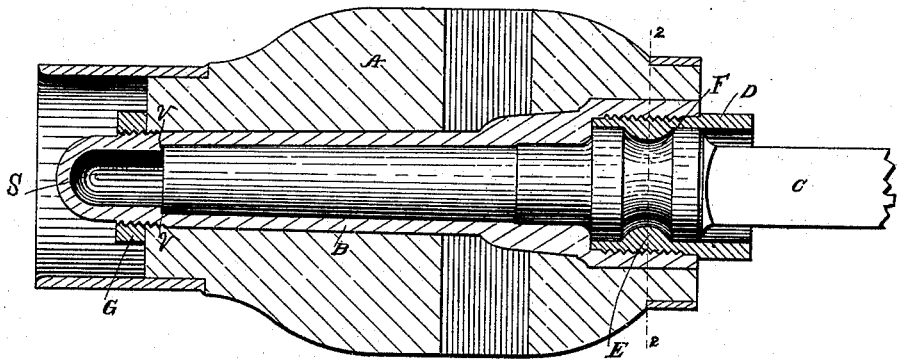
Figure 2:
Figure 3:
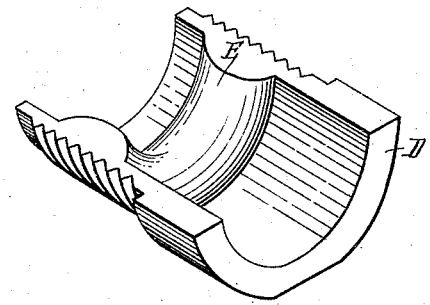
Figure 4:
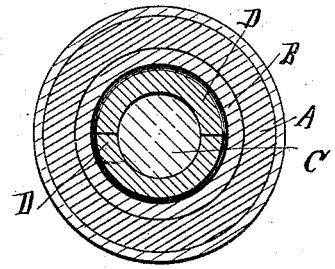

In the drawings forming a part of this specification, Figure 1 is a longitudinal section of the wheel-hub, showing the axle in full; Fig. 2, an end view of Fig. 3; Fig. 3, an enlarged perspective of lettered details from Fig. 1; Fig. 4, a section on line 2 2 in Fig. 1, looking from a point at the left.

Referring to the lettered parts of the drawings, C is the vehicle-axle, provided at a point near where the rear end of the wheel-hub comes with a peripheral groove F.

The box B of the wheel-hub A is internally threaded a short distance from its inner end, as shown in Fig. 1. This box B is also closed at its outer end and internally chambered, as at S, Fig. 1, said box being reamed out to form a bearing for that portion of the axle which enters the hub, the outer end of which axle comes very near the shoulder *v*, Fig. 1, which shoulder is formed when the box is reamed out, leaving the chamber S beyond said shoulder.

Referring to Fig. 3, at D is shown one-half of a two-part nut, a portion of the periphery of said nut being threaded, so as to screw into the internally-threaded end of the box B. Both parts of this nut are provided with an internal rib E, conforming to the shape of the peripheral groove F in the axle, so that when the two-part nut is screwed into the box, as shown in Fig. 1, the internal rib E of said two-part nut will be in the groove F of the axle. The sides of the rib E and groove F when viewed in cross-section must be either curved or slanting, so as to represent approximately either a semicircle or a V, so that the weight of the vehicle-body (the wheel contacting with the ground) will automatically cause a close contact of the surfaces of the groove and rib at the under side of the axle. This nut is flattened on two sides, so that it may be screwed in with a wrench or held with a wrench and the wheel turned onto it, by which means the wheel is held onto the axle by the two-part nut D.

A wheel thus constructed will not shuck endwise or rattle, and it does not need any washers, either leather, rubber, or otherwise, to prevent said shucking, from the fact that the force of gravity causes the lower periphery of the groove F in the axle C to be in close contact with the surface of the rib E of the lower portion of the two-part nut D, as above stated, notwithstanding the box and axle might have become much worn. This idea is illustrated in Fig. 1, in which it will be noticed that there is a close contact with the groove and rib at the lower side of the axle and a separation between said parts at the upper side of the axle, as might be the case after the parts had become worn. It will be observed that since the outer end of the box B is closed and the inner end is thoroughly stopped with the two-part nut D it is almost impossible for any sand to get onto the bearings of the wheel. The outer end of the box B is provided with a threaded portion, onto which is screwed a nut G, which holds the hub A onto said box. Since this construction is proof against any ingress of sand and the wheel-box is provided with the chamber S, by filling said chamber with a lubricant before the wheel is placed on the axle the vehicle will not have to be oiled so frequently as in many prior constructions.

It should have been stated that the outer end closure of the box B is made integral with said box, by which means no oil can ever work out between threads, as might be the case if this end closure was screwed to the box.

Having thus described my invention, what I claim as new, and desire to secure by Letters Patent of the United States, is—

1. The combination of a wheel having a box internally threaded within its inner end, an axle having a peripheral groove at said end, and a two-part nut adapted to screw into the threaded end of the box of said wheel and provided with the internal rib fitting into the peripheral groove of said axle, the sides of said rib and groove when viewed in cross-section being curved or slanting, substantially as set forth.

2. The combination of a wheel having a box internally threaded within its inner end, an axle having a peripheral groove at said end of the box, and a two-part nut adapted to screw into the threaded end of said box of the wheel and provided with the internal rib fitting into the peripheral groove of said axle, the sides of said rib and groove when viewed in cross-section being curved or slanting, the outer end of the box being closed and internally chambered, substantially as set forth.

3. The combination of a wheel having a box internally threaded within its inner end, an axle having a peripheral groove at said end, and a two-part nut adapted to screw into the threaded end of the box of said wheel and provided with the internal rib fitting into the peripheral groove of said axle, the sides of said rib and groove when viewed in cross-section being curved or slanting, and a nut screwed onto the outer end of the box of said wheel for holding said box in the hub, substantially as set forth.

In testimony to the foregoing I have hereunto subscribed my name in the presence of two witnesses.

LEVI HARRIS.

Witnesses:
JOHN GALLIGAN,
CARL RUDOW.